United States Patent Office 3,558,655
Patented Jan. 26, 1971

3,558,655
BENZO[b]THIOPHENEACETIC ACID COMPOUNDS
James S. Kaltenbronn, Ann Arbor, Mich., assignor to Parke, Davis & Company, Detroit, Mich., a corporation of Michigan
No Drawing. Continuation-in-part of application Ser. No. 752,805, Aug. 15, 1968. This application June 25, 1969, Ser. No. 836,593
Int. Cl. A61k 27/00; C07d 63/22
U.S. Cl. 260—330.5
6 Claims

ABSTRACT OF THE DISCLOSURE 4-phenylbenzo[b]thiophene - 2 - acetic acids, 7-phenylbenzo[b]thiophene - 3 - acetic acids, 7 - phenylbenzo[b]thiophene - 4 - acetic acids, 2-phenylbenzo[b]thiophene-6-acetic acids, 3-phenylbenzo[b]thiophene-7-acetic acids, 4-phenylbenzo[b]-thiophene-7-acetic acids, 7-cyclohexylbenzo[b]thiophene-3-acetic acids, and 7-cyclohexylbenzo[b]thiophene-4-acetic acids, optionally substituted in the phenyl group by halogen or methyl and on the α-carbon by lower alkyl; carboxylate salts thereof; and their production by the hydrolysis of a correspondingly substituted carboxylic acid precursor. The compounds of the invention are useful as anti-inflammatory agents.

CROSS REFERENCE TO RELATED APPLICATION

This application is a continuation-in-part of co-pending application Ser. No. 752,805, filed Aug. 15, 1968 now abandoned.

SUMMARY AND DETAILED DESCRIPTION

The present invention relates to new heterocyclic acid compounds that are useful as pharmacological agents and to methods for their production. More particularly, the invention relates to new benzo[b]thiopheneacetic acid compounds that can be represented by the formula $$W-\overset{R_1}{\underset{|}{C}}H-COOH \quad (I)$$

and to pharmaceutically acceptable salts thereof; where $R_1$ is hydrogen or a lower alkyl group having not more than four carbon atoms and W represents a 4-phenylbenzo[b]thiophene-2- group having the formula

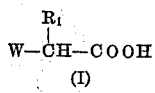

a 7-phenylbenzo[b]thiophene-3- group having the formula

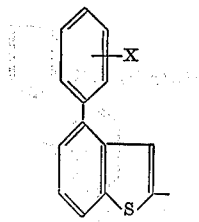

a 7-phenylbenzo[b]thiophene-4- group having the formula

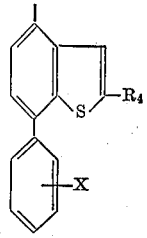

a 2-phenylbenzo[b]thiophene-6- group having the formula

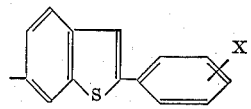

a phenylbenzo[b]thiophene-7- group having the formula

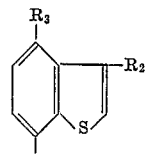

a 7-cyclohexylbenzo[b]thiophene-3- group having the formula

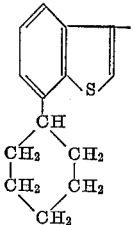

or a 7-cyclohexylbenzo[b]thiophene-4- group having the formula

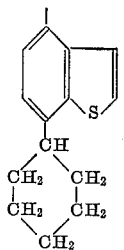

where one of $R_2$ and $R_3$ is hydrogen and the other of $R_2$ and $R_3$ is a phenyl group having the formula

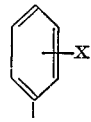

$R_4$ is hydrogen or methyl, and X is hydrogen, halogen, or methyl.

In accordance with the invention, benzo[b]thiopheneacetic acid compounds having Formula I above and salts thereof are produced by hydrolyzing a compound that can be represented by the formula

wherein $R_1$ and W are as defined earlier and Y is a group hydrolyzable to a carboxyl group. Some examples of groups hydrolyzable to a carboxyl group are cyano,

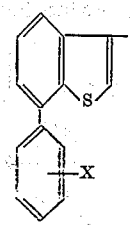

alkoxycarbonyl, aryloxycarbonyl, aralkoxycarbonyl, carbamoyl, alkyl-substituted carbamoyl, trihalomethyl, amidino, alkyl-substituted amidino, haloformyl,

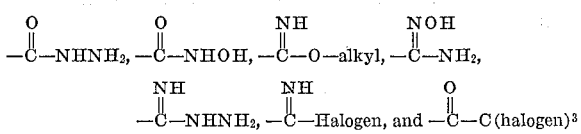

The precise nature of the group Y which is hydrolyzable to a carboxyl group is not critical because in carrying out the process it is converted to a carboxyl group. Therefore, if desired, the group Y can in appropriate cases contain one or more substituents such as lower alkyl, lower alkoxy, halogen, nitro, carboxy, or alkoxycarbonyl, and in those cases where the group Y is basic, it can also be employed in the form of an acid-addition salt. As used herein the term "group hydrolyzable to a carboxyl group" designates substituted as well as unsubstituted radicals. Compounds in which the group Y is the cyano group or an alkoxycarbonyl group are preferred starting materials in the process because they are quite readily available and are hydrolyzable to the carboxyl derivatives in high yields.

The hydrolysis can be carried out under either acidic or alkaline conditions, by the use of an acidic or basic hydrolytic agent. Alkaline conditions are preferred and should be used exclusively with certain of the Y groups, for example, with the

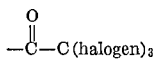

group. The hydrolysis can be carried out in water or in an aqueous solution of an unreactive, water-miscible, organic solvent such as an aliphatic alcohol, dioxane, tetrahydrofuran, ethylene glycol, propylene glycol or a lower alkyl ether of ethylene glycol or of diethylene glycol, to which has been added an acid or a base to render the medium acidic or alkaline. Some examples of suitable bases are alkali metal hydroxides, alkaline earth metal hydroxides, alkali metal carbonates, alkali metal alkoxides, and trialkylammonium hydroxides. Some examples of suitable acids are mineral acids, strong organic acids such as p-toluenesulfonic acid, and acidic ion exchange resins. Preferred agents are alkali metal hydroxides such as sodium hydroxide or potassium hydroxide. The hydrolytic agent is normally employed in considerable excess.

The hydrolysis is carried out by heating a solution or suspension of the starting material in a solvent medium containing an acid or a base until hydrolysis of the group Y is substantially complete. The required time and temperature will vary depending on the nature of the specific starting material of Formula II that is employed and on the basic or acidic agent used. In general, however, the reaction is carried out at a temperature between about 25° and 200° C., or at the reflux temperature of the solvent, with a reaction time of from one to 75 hours. When using one of the preferred basic hydrolytic agents, the reaction is usually carried out at a temperature between 60° and 125° C., and is substantially complete within less than 24 hours. When the hydrolysis is carried out under alkaline conditions, the product is present in the reaction mixture in the form of a salt; it can be isolated in this form, or following treatment with an acid, preferably a mineral acid, it can be isolated as the free acid. When the hydrolysis is carried out under acidic conditions, the product is present in the reaction mixture as the free acid, and it can be isolated directly in this form, or by subsequent treatment with a base, it can be isolated in salt form.

Starting materials required for use in the foregoing process can be prepared by a variety of methods. For example, various ethyl 7 - phenylbenzo[b]thiophene - 4- acetates can be repaired by the following series of reactions. A substituted benzoyl chloride having the formula

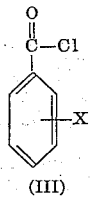

(III)

is reacted with thiophene in the presence of stannic chloride to give a 2-benzoylthiophene having the formula

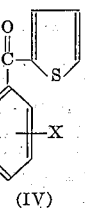

(IV)

The 2-benzoylthiophene intermediate is next reacted with zinc and ethyl bromoacetate, and the resulting ethyl 3-phenyl-3-(2-thienyl)acrylate is catalytically hydrogenated to give an ethyl 3-phenyl-3-(2-thienyl)propionate having the formula

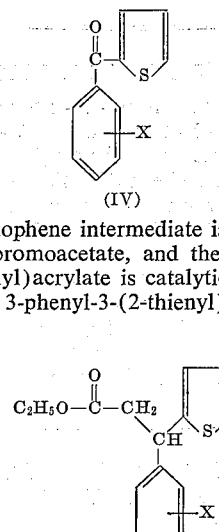

(V)

This ethyl 3-phenyl-3-(2-thienyl)propionate intermediate is then reduced by reaction with lithium aluminum hydride and the reaction product hydrolyzed to give a 3-phenyl-3-(2-thienyl)propan-1-ol having the formula

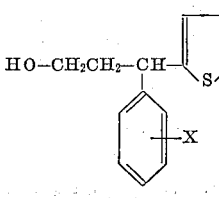

(VI)

which is in turn reacted with phosphorus tribromide to give a 3-phenyl-3-(2-thienyl)propyl bromide having the formula

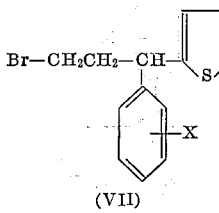

(VII)

This bromide intermediate is next reacted with sodium cyanide in aqueous acetone-ethanol, and the 4-phenyl-4-(2-thienyl)-butyronitrile product having the formula

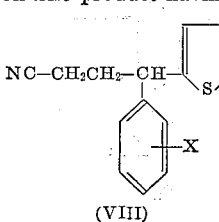

(VIII)

is hydrolyzed by reaction with aqueous potassium hydroxide to give a 4-phenyl-4-(2-thienyl)butyric acid having the formula

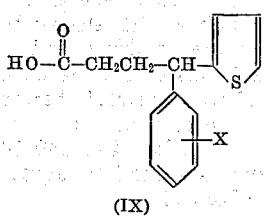

(IX)

This butyric acid intermediate is then cyclized by reaction with trifluoroacetic acid anhydride in trifluoroacetic acid, and the 7-phenyl-6,7-dihydrobenzo[b]thiophen-4(5H)-one product having the formula

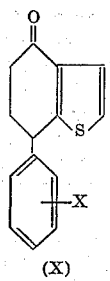

(X)

is reacted with zinc and an ethyl bromoacetate compound having the formula

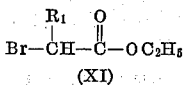

(XI)

to give an ethyl 7-phenyl-6,7-dihydrobenzo[b]thiophene-4-acetate having the formula

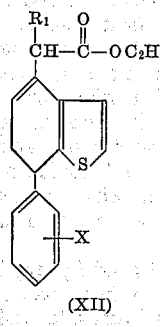

(XII)

which is finally dehydrogenated by reaction with sulfur at about 230° C. to give one of the desired ethyl 7-phenylbenzo[b]thiophene-4-acetate starting materials having the formula

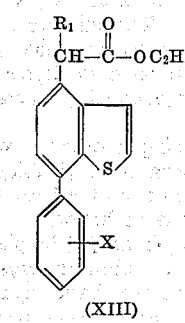

(XIII)

In Formulas III to XIII, $R_1$ and X have the same meaning as previously given.

Also, for example, various 3-phenylbenzo[b]thiophene-7-acetonitrile starting materials can be prepared by the following series of reactions. o-Thiocresol is reacted with a phenacyl bromide having the formula

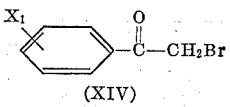

(XIV)

and the 2-[(o-tolyl)thio]acetophenone product having the formula

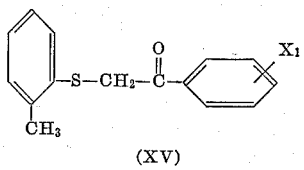

(XV)

is cyclized by reaction with phosphorus pentoxide in phosphoric acid to give a 3-phenyl-7-methylbenzo[b]thiophene having the formula

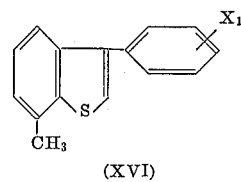

(XVI)

The 3-phenyl-7-methylbenzo[b]thiophene intermediate is next reacted with N-bromosuccinimide in the presence of benzoyl peroxide in carbon tetrachloride to give a 3-phenylbenzo[b]thiophene-7-methyl bromide having the formula

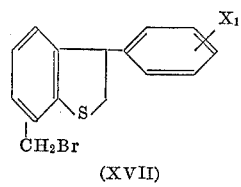

(XVII)

which is finally reacted with sodium cyanide in aqueous acetone to give the desired 3-phenylbenzo[b]thiophene-7-acetonitrile starting material having the formula

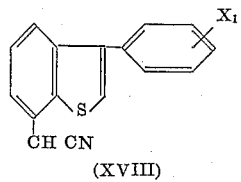

(XVIII)

In the foregoing Formulas XIV to XVIII, $X_1$ is hydrogen or halogen.

Further, by way of example, α-alkyl-3-phenylbenzo[b]thiophene-7-acetonitrile starting materials for use in the process described above are prepared by reacting a 3-phenylbenzo[b]thiophene-7-acetonitrile having Formula XVIII above first with sodium hydride and then with an alkyl halide having the formula

(XIX)

to give the desired starting material having the formula

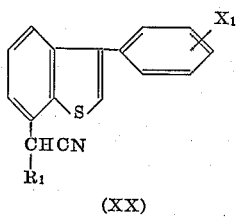

(XX)

where $R_1$ and $X_1$ are as defined previously and Hal represents chlorine, bromine, or iodine.

The preparation of specific examples of the starting materials described above and others required for the practice of the invention is described in detail hereinafter.

The free acid compounds of the invention, represented by Formula I above, form pharmaceutically acceptable carboxylate salts with a variety of inorganic and organic bases. Some examples of suitable bases are sodium hydroxide, potassium hydroxide, calcium hydroxide, aluminum hydroxide, sodium carbonate, potassium bicarbonate, choline, 2-hydroxyethylamine, ammonia, and diethylamine. The preferred salts of the invention are the salts of an alkali metal, an alkaline earth metal, ammonia, or a substituted ammonia. The carboxylate salts and free acids differ with respect to certain physical properties such as solubility in polar solvents, but they are otherwise equivalent for the purposes of the invention. If desired, the compounds of the invention wherein $R_1$ is lower alkyl can also be obtained in optically active forms by resolving an optically inactive free acid final product by fractional crystallization of a salt formed with an optically active base.

The compounds of the invention are new chemical compounds that are useful as pharmacological agents, especially as anti-inflammatory agents. As such, they are of value in mitigating the symptoms associated with inflammatory conditions as well as in preventing or suppressing the occurrence of inflammation. Their anti-inflammatory activity is demonstrable and quantitatively measurable by means of a test designed to measure the ability of a compound to delay the normal appearance of an erythema in animals exposed to ultraviolet radiation under standardized conditions. The test procedure that is used has been described in Archives Internationales de Pharmacodynamie et de Therapie, vol. 116, pages 261–292, 1958. This test has been found to be a reliable indicator of anti-inflammatory activity, as demonstrated, for example, for the known clinically useful agents, aminopyrine, antipyrine, and aspirin. The activities of some representative compounds of the present invention, as determined by this standard test procedure are tabulated below. In the table, the activities are expressed in terms of the minimum dose that was effective in delaying the appearance of an erythema.

ANTI-INFLAMMATORY ACTIVITY

| Compound: | Minimum effective dose, mg./kg. |
|---|---|
| 4-phenylbenzo[b]thiophene-2-acetic acid | 6:2 |
| 7-phenylbenzo[b]thiophene-3-acetic acid | 0.1 |
| 7-phenylbenzo[b]thiophene-4-acetic acid | 0.1 |
| 7-(m-tolyl)benzo[b]thiophene-4-acetic acid | 3.1 |
| α-methyl - 7 - phenylbenzo[b]thiophene-4-acetic acid | 0.4 |
| 2-phenylbenzo[b]thiophene-6-acetic acid | 12.5 |
| 3-phenylbenzo[b]thiophene-7-acetic acid | 0.4 |
| 3-(p-fluorophenyl)benzo[b]thiophene - 7 - acetic acid | 3.1 |
| α-butyl-3-phenylbenzo[b]thiophene-7-acetic acid | 6.2 |
| 4-phenylbenzo[b]thiophene-2-acetic acid | 0.2 |
| 2-methyl-7-phenylbenzo[b]thiophene - 4 - acetic acid | 0.4 |
| 7-cyclohexylbenzo[b]thiophene-3-acetic acid | 3.1 |

The invention is illustrated by the following examples.

EXAMPLE 1

To a solution of 6.7 g. of 4-phenylbenzo[b]thiophene-2-acetonitrile in 100 ml. of ethanol and 25 ml. of dioxane is added 20 ml. of 5.3 N aqueous potassium hydroxide, and the resulting mixture is heated under reflux for 18 hours and evaporated under reduced pressure. The residue is treated with a mixture of water and ether, and the aqueous layer is separated, washed with ether, and acidified with dilute hydrochloric acid. The acidified mixture is then extracted with ether, and the ether extracts are washed with water until neutral and dried. The dried solution is then evaporated, and the black oily residue that is obtained is purified by chromatography on a column prepared from 120 g. of silica gel. The column is first eluted with benzene; these eluates are discarded. It is next eluted with a 10% ether-in-benzene mixture, and these eluates are combined and evaporated. The residue obtained is dissolved in benzene. The benzene solution is treated with activated charcoal and after filtration, is evaporated to dryness to give 4-phenylbenzo[b]thiophene-2-acetic acid; M.P. 140–143° C., following successive crystallizations from aqueous ethanol, benzene, and benzene-hexane.

EXAMPLE 2

A solution of 11.7 g. of potassium hydroxide in 50 ml. of water is added to a solution of 11.7 g. of ethyl 7-phenylbenzo[b]thiophene - 3 - acetate in 100 ml. of ethanol, and the resulting mixture is heated under reflux for one hour and then evaporated under reduced pressure. The residue is dissolved in water, and the aqueous solution is washed with ether and acidified with dilute hydrochloric acid. The solid 7-phenylbenzo[b]thiophene-3-acetic acid that precipitates is isolated and crystallized from benzene-hexane, M.P. 137–138° C.

Utilizing the foregoing procedure with only minor variations, the following benzo[b]thiopheneacetic acid compounds are obtained from the basic hydrolysis of the ester compounds designated below:

(a) 2-methyl - 7 - phenylbenzo[b]thiophene-4-acetic acid, M.P. 132–134° C., following crystallization from benzene; from the basic hydrolysis of ethyl 2-methyl-7-phenylbenzo[b]thiophene-4-acetate.

(b) 7-cyclohexylbenzo[b]thiophene - 4 - acetic acid; from the basic hydrolysis of ethyl 7 - cyclohexylbenzo[b]thiophene-4-acetate.

EXAMPLE 3

A solution of 10 g. of potassium hydroxide in 25 ml. of water is added to a solution of 8.3 g. of ethyl 7-phenylbenzo[b]thiophene-4-acetate in 100 ml. of ethanol, and the resulting mixture is heated under reflux for two hours and then evaporated under reduced pressure. The residue is dissolved in water, and the aqueous solution is washed with ether and acidified with dilute hydrochloric acid. The acidified mixture is extracted with ether, and the ethereal solution is washed with water, dried, and evaporated to give a black solid residue of 7-phenylbenzo[b]thiophene-4-acetic acid, which is purified by chromatography on silica gel, as described in Example 1 above, 129.5° C.

To a solution of 2.68 g. of 7-phenylbenzo[b]thiophene-4-acetic acid in 10 ml. of hot ethanol is added 10 ml. of 1.0 N aqueous sodium hydroxide, and the resulting solution is evaporated to dryness under reduced pressure to give sodium 7-phenylbenzo[b]thiophene-4-acetate.

To a warm solution of 2.90 g. of sodium 7-phenylbenzo[b]thiophene-4-acetate in 50 ml. of methanol is added with stirring a solution of 1.4 g. of choline chloride in 10 ml. of methanol. The mixture is stirred for one hour, filtered to remove the insoluble sodium chloride, and the filtrate is evaporated to dryness under reduced pressure to give 7-phenylbenzo[b]thiophene-4-acetic acid choline salt.

Utilizing the foregoing procedure with only minor variations, the following benzo[b]thiopheneacetic acid compounds are obtained from the basic hydrolysis of the ester compounds designated below:

(a) α-Methyl-7-phenylbenzo[b]thiophene-4-acetic acid, M.P. 159.5–161.5° C., following crystallization from aqueous ethanol; from the basic hydrolysis of ethyl α-methyl-7-phenylbenzo[b]thiophene-4-acetate.

(b) 7-phenyl-α-propylbenzo[b]thiophene-4-acetic acid, M.P. 129–131° C., following crystallization from aqueous ethanol; from the basic hydrolysis of ethyl 7-phenyl-α-propylbenzo[b]thiophene-4-acetate.

(c) 7-(o-fluorophenyl)benzo[b]thiophene-4-acetic acid,

M.P. 125–126° C., following crystallization from benzene-hexane; from the basic hydrolysis of ethyl 7-(o-fluorophenyl)benzo[b]thiophene-4-acetate.

(d) 7-(m-tolyl)benzo[b]thiophene-4-acetic acid, M.P. 143–144.5° C.; from the basic hydrolysis of ethyl 7-(m-tolyl)benzo[b]thiophene-4-acetate.

(e) α-Methyl-7-(o-fluorophenyl)benzo[b]thiophene-4-acetic acid, M.P. 116–117.5° C. (benzene-hexane); from the basic hydrolysis of ethyl α-methyl-7-(o-fluorophenyl)benzo[b]thiophene-4-acetate.

(f) α-Ethyl-7-(o-fluorophenyl)benzo[b]thiophene-4-acetic acid, M.P. 138.5–139.5° C. (benzene-hexane); from the basic hydrolysis of ethyl α-ethyl-7-(o-fluorophenyl)benzo[b]thiophene-4-acetate.

(g) α,2-dimethyl-7-phenylbenzo[b]thiophene-4-acetic acid, M.P. 93–95° C., following crystallization from aqueous ethanol; from the basic hydrolysis of ethyl α,2-dimethyl-7-phenylbenzo[b]thiophene-4-acetate.

(h) 7-cyclohexylbenzo[b]thiophene-3-acetic acid, M.P. 135–136° C., following crystallization from aqueous ethanol; from the basic hydrolysis of ethyl 7-cyclohexylbenzo[b]thiophene-3-acetate.

EXAMPLE 4

A mixture consisting of 2.4 g. of 2-phenylbenzo[b]thiophene-6-acetonitrile, 2.6 g. of potassium hydroxide, and 75 ml. of diethylene glycol is heated at 130° C. for 18 hours, cooled, poured into water, and the aqueous mixture is acidified with dilute hydrochloric acid. The acidified mixture is extracted with ethyl acetate, and the combined ethyl acetate extracts are washed with water, dried, and evaporated to give 2-phenylbenzo[b]thiophene-6-acetic acid, M.P. 225–226.5° C., following crystallization from ethyl acetate.

EXAMPLE 5

A solution of 108 g. of potassium hydroxide in 300 ml. of water is added to a solution of 108 g. of 3-phenylbenzo[b]thiophene-7-acetonitrile in 2 liters of ethanol, and the resulting mixture is heated under reflux for 18 hours and then evaporated under reduced pressure. The residue is treated with a mixture of water and ether, and the aqueous layer is separated, washed with ether, and acidified with dilute hydrochloric acid. The acidified mixture is then extracted with ether, and the ether extracts are washed with water until neutral and dried. The dried ethereal solution is evaporated, and the oily residue obtained is purified by chromatography on silica gel as described for the product of Example 1 above. The solid obtained from the 10% ether-in-benzene eluates is 3-phenylbenzo[b]thiophene-7-acetic acid, M.P. 129–130° C., following crystallization from benzene.

Utilizing the foregoing procedure with only minor variations in operating conditions and in isolation technique, the following phenylbenzo[b]thiopheneacetic acid compounds are obtained from the basic hydrolysis of the nitrile compounds designated below:

(a) α-Methyl-3-phenylbenzo[b]thiophene-7-acetic acid, M.P. 162–1640° C., following crystallization from benzene; from hydrolysis of α-methyl-3-phenylbenzo[b]thiophene-7-acetonitrile.

(b) α-Ethyl-3-phenylbenzo[b]thiophene-7-acetic acid, M.P. 155–157.5° C. (benzene); from reaction of 9.0 g. of α-ethyl-3-phenylbenzo[b]thiophene-7-acetonitrile in 250 ml. of ethanol with 9.0 g. of potassium hydroxide in 30 ml. of water at reflux for 2.5 days.

(c) α-Butyl-3-phenylbenzo[b]thiophene-7-acetic acid, M.P. 94.5–95.5° C. (benzene-hexane); from hydrolysis of α-butyl-3-phenylbenzo[b]thiophene-7-acetonitrile.

(d) 3-(p-fluorophenyl)benzo[b]thiophene-7-acetic acid, M.P. 152–153.5° C. (benzene-hexane); from hydrolysis of 3-(p-fluorophenyl)benzo[b]thiophene-7-acetonitrile.

(e) 3-(p-chlorophenyl)benzo[b]thiophene-7-acetic acid, M.P. 152–154° C. (benzene); from hydrolysis of 3-(p-chlorophenyl)benzo[b]thiophene-7-acetonitrile.

(f) 3-(p-bromophenyl)benzo[b]thiophene-7-acetic acid, M.P. 159–162° C. (benzene); from hydrolysis of 3-(p-bromophenyl)benzo[b]thiophene-7-acetonitrile.

EXAMPLE 6

Utilizing a procedure analogous to that described in the foregoing examples, the following phenylbenzo[b]thiopheneacetic acid compounds are obtained from the basic hydrolysis of the nitrile compounds designated below:

(a) 4-phenylbenzo[b]thiophene-7-acetic acid, M.P. 139.5–141.5° C. (benzene-hexane); from hydrolysis of 4-phenylbenzo[b]thiophene-7-acetonitrile.

(b) 4-(m-fluorophenyl)benzo[b]thiophene-7-acetic acid, M.P. 123–124.5° C.; from hydrolysis of 4-(m-fluorophenyl)benzo[b]thiophene-7-acetonitrile.

(c) 4-(o-chlorophenyl)benzo[b]thiophene-7-acetic acid, M.P. 158–161° C., following chromatography on silica gel and crystallization from ethanol-water; from hydrolysis of 4-(o-chlorophenyl)benzo[b]thiophene-7-acetonitrile.

(d) 4-(m-chlorophenyl)benzo[b]thiophene-7-acetic acid, M.P. 131.5–133.5° C., following successive crystallizations from benzene-hexane and benzene; from hydrolysis of 4-(m-chlorophenyl)benzo[b]thiophene-7-acetonitrile.

(e) α-Methyl-4-phenylbenzo[b]thiophene-7-acetic acid, M.P. 132–134.5° C., following two crystallizations from benzene-hexane; from hydrolysis of α-methyl-4-phenylbenzo[b]thiophene-7-acetonitrile.

(f) α-Ethyl-4-phenylbenzo[b]thiophene-7-acetic acid, M.P. 158–160° C., following chromatography on silica gel and crystallization from ethanol-water; from hydrolysis of α-ethyl-4-phenylbenzo[b]thiophene-7-acetonitrile.

(g) α-Methyl-7-phenylbenzo[b]thiophene-3-acetic acid, M.P. 122–124° C., following chromatography on silica gel and crystallization from ethanol-water; from hydrolysis of α-methyl-7-phenylbenzo[b]thiophene-3-acetonitrile.

RESOLUTION OF OPTICAL ISOMERS

A solution of 43.4 g. of α-methyl-3-phenylbenzo[b]thiophene-7-acetic acid (as prepared according to Example 5(a)) in 300 ml. of warm ethyl acetate is added to a solution of 18.6 g. of 1-α-phenethylamine in 75 ml. of ethyl acetate, and the resulting mixture is kept at room temperature for two days. The crystalline salt that separates is collected on a filter, and the filtrate is set aside. The solid salt is then recrystallized four times from ethyl acetate-methanol. Each crystallization solution is kept at room temperature for two days, the mother liquors are combined with the filtrate set aside above, and the combined solution is retained for later use. The salt obtained following the four recrystallizations, M.P. 154–157.5° C., is mixed with 5% hydrochloric acid, and the acid mixture is extracted with ether. The ether extracts are combined, washed with 5% hydrochloric acid and with water until neutral, dried over anhydrous sodium sulfate, and evaporated to dryness under reduced pressure. The oily residue that is obtained is crystallized from a mixture of hexane and benzene to give d-α-methyl-3-phenylbenzo[b]thiophene-7-acetic acid; M.P. 102.5–105° C., $[\alpha]_D^{25}$ +100° (1.02% in chloroform).

The ethyl acetate-methanol combined solution retained above is evaporated to dryness, and the solid obtained is mixed with excess 5% hydrochloric acid. The acidic mixture is extracted with ether, and the ether extracts are washed with 5% hydrochloric acid and with water until neutral, dried, and evaporated to dryness to give α-methyl-3-phenylbenzo[b]thiophene-7-acetic acid (enriched in the levorotatory isomer). This acid (18.9 g.) is dissolved in 130 ml. of ethyl acetate, the solution is added to a solution of 8.1 g. of d-α-phenethylamine in 35 ml. of ethyl acetate, and the mixture is kept at room temperature for two days. The crystalline salt that separates is isolated and recrystallized three times from ethyl acetate-methanol. The purified salt thus obtained, M.P. 156.5–158° C., is then treated with 5% hydrochloric acid, and the acidic mixture is treated as in the first procedure above to give 1-α-methyl - 3 - phenylbenzo[b]thiophene-7-acetic acid; M.P. 103–105.5° C., $[\alpha]_D^{25}$ —96.5° (1.03% in chloroform).

STARTING MATERIALS

The various starting materials and intermediates employed in the foregoing examples are prepared by the methods described in the following.

(A) 2-benzoylthiophenes (1) 2-(o-fluorobenzoyl)thiophene.—To a stirred mixture consisting of 81.7 g. of thiophene, 154 g. of o-fluorobenzoyl chloride, and one liter of benzene is added dropwise 253 g. of stannic chloride while the temperature is maintained below 10° C. The resulting mixture is stirred below 10° C. for one hour and at room temperature for two hours and is then decomposed with dilute hydrochloric acid. The organic phase is separated, washed with water, with saturated aqueous sodium bicarbonate, and with water again until neutral, dried, and concentrated. The residue is distilled to give 2-(o-fluorobenzoyl)thiophene, B.P. 108–115° C./0.7 mm. Hg.

(2) 2-(m-toluyl)thiophene, B.P. 103–110° C./0.07–0.15 mm. Hg; obtained by the method of (1) above from the reaction of m-toluyl chloride with thiophene in the presence of stannic chloride.

(3) 2-benzoyl-5-methylthiophene, B.P. 135–150° C./ 1.2–1.5 mm. Hg; obtained by the method of (1) above from the reaction of benzoyl chloride with 2-methylthiophene in the presence of stannic chloride.

(B) Ethyl 3-phenyl-3-(2-thienyl)acrylates (1) Ethyl 3-(o-fluorophenyl)-3-(2-thienyl)acrylate.—To a mixture consisting of 104.5 g. of 2-(o-fluorobenzoyl) thiophene, 101.5 g. of ethyl bromoacetate, 40 g. of zinc, and 600 ml. of benzene is added a crystal of iodine, and the resulting mixture is heated under reflux for 90 minutes. It is then cooled and decomposed with dilute hydrochloric acid. The organic phase is separated, washed with water, with saturated aqueous sodium bicarbonate, with water again until neutral, dried, and concentrated. The residue is distilled to give ethyl 3-(o-fluorophenyl)-3-(2-thienyl)acrylate, B.P. 143–145° C./0.7–1.1 mm. Hg.

(2) Ethyl 3-(m-tolyl)-3-(2-thienyl)acrylate, B.P. 120–130° C./0.15–0.25 mm. Hg; obtained by the method of (1) above from the reaction of 2-(m-toluyl)thiophene with ethyl bromoacetate in the presence of zinc.

(3) Ethyl 3-(5-methyl-2-thienyl)-3-phenylacrylate, B.P. 160–190° C./1.2–1.4 mm. Hg; obtained by the method of (1) above from the reaction of 2-benzoyl-5-methylthiophene with ethyl bromoacetate in the presence of zinc.

(C) Ethyl 3-phenyl-3-(2-thienyl)propionates (1) Ethyl 3-phenyl-3-(2-thienylpropionate.—A mixture consisting of 161 g. of ethyl 3-phenyl-3-(2-thienyl)acrylate, 13 g. of 20% palladium-on-charcoal, and one liter of methanol at 27° C. is treated with hydrogen at an initial pressure of 50 lbs./in.$^2$ until a sufficient quantity of hydrogen is absorbed to reduce the double bond. The mixture is then filtered, and the filtrate is distilled to give ethyl 3-phenyl-3-(2-thienyl)propionate, B.P. 117–130° C./0.2–0.3 mm. Hg.

(2) Ethyl 3-(o-fluorophenyl)-3-(2-thienyl)propionate, B.P. 112–115° C./0.1–0.2 mm. Hg; obtained by the method of (1) above from the catalytic hydrogenation of ethyl 3-(o-fluorophenyl)-3-(2-thienyl)acrylate.

(3) Ethyl 3-(m-tolyl)-3-(2-thienyl)propionate, B.P. 139–160° C./1.5–2.0 mm. Hg; obtained by the method of (1) above from the catalytic hydrogenation of ethyl 3-(m-tolyl)-3-(2-thienyl)acrylate.

(4) Ethyl 3-(5-methyl-2-thienyl)-3-phenylpropionate, B.P. 115–135° C./0.4–0.6 mm. Hg; obtained by the method of (1) above from the catalytic hydrogenation of ethyl 3-(5-methyl-2-thienyl)-3-phenylacrylate.

(D) 3-phenyl-3-(2-thienyl)propan-1-ols (1) 3-phenyl-3-(2-thienyl)propan-1-ol.— A solution of 151.9 g. of ethyl 3-phenyl-3-(2-thienyl)propionate in 750 ml. of dry ether is added dropwise to a suspension of 22.2 g. of lithium aluminum hydride in 450 ml. of dry ether, and the resulting mixture is heated under reflux for 90 minutes. It is then cooled and decomposed by treatment with ethyl acetate and with water, and the organic phase is separated, washed with saturated aqueous sodium chloride, and dried. The dried solution is then distilled to give 3-phenyl - 3 - (2-thienyl)propan - 1 - ol, B.P. 119–165° C. 0.6–0.7 mm. Hg.

(2) 3-(o-fluorophenyl)-3-(2-thienyl)propan-1-ol, B.P. 91–150° C./0.4–0.5 mm. Hg; obtained by the method of (1) above from the reaction of ethyl 3-(o-fluorophenyl)-3-(2-thienyl)propionate with lithium aluminum hydride.

(3) 3-(m-tolyl)-3-(2-thienyl)propan-1-ol, B.P. 102–140° C./0.30–0.35 mm. Hg; obtained by the method of (1) above from the reaction of ethyl 3-(m-tolyl)-3-(2-thienyl)-propionate with lithium aluminum hydride.

(4) 3-(5-methyl-2-thienyl)-3-phenylpropan-1-ol, B.P. 128–135° C./0.2–0.5 mm. Hg; obtained by the method of (1) above from the reaction of ethyl 3-(5-methyl-2-thienyl)-3-phenylpropionate with lithium aluminum hydride.

(E) 3-phenyl-3-(2-thienyl)propyl bromides (1) 3-phenyl-3-(2-thienyl)propyl bromide.—A solution of 51 g. of phosphorus tribromide in 400 ml. of ether is added dropwise to a solution of 111.4 g. of 3-phenyl-3-(2-thienyl)propan-1-ol in 600 ml. of ether while the temperature is maintained at 0–10° C., and the resulting mixture is stirred overnight at room temperature. The gum that forms during this time is separated and discarded, and the solution is washed with water, with 5% sodium hydroxide, and with water again until neutral, and dried. The dried solution is then distilled to give 3-phenyl-3-(2-thienyl)propyl bromide, B.P. 132–138° C./0.4–0.5 mm. Hg.

(2) 3-(o-fluorophenyl)-3-(2-thienyl)propyl bromide, B.P. 110–168° C./0.3–0.4 mm. Hg; obtained by the method of (1) above from the reaction of 3-(o-fluorophenyl)-3-(2-thienyl)propan-1-ol with phosphorus tribromide.

(3) 3-(m-tolyl)-3-(2-thienyl)propyl bromide, B.P. 109–160° C./0.3–0.4 mm. Hg; obtained by the method of (1) above from the reaction of 3-(m-tolyl)-3-(2-thienyl) propan-1-ol with phosphorus tribromide.

(4) 3-(5-methyl-2-thienyl)-3-phenylpropyl bromide, B.P. 138–145° C./0.2–1.0 mm. Hg; obtained by the method of (1) above from the reaction of 3-(5-methyl-2-thienyl)-3-phenylpropan-1-ol with phosphorus tribromide.

(F) 4-Phenyl-4-(2-thienyl)butyronitriles (1) 4-phenyl-4-(2-thienyl)butyronitrile.—A solution of 18.8 g. of sodium cyanide in 100 ml. of water is added to a mixture consisting of 89.7 g. of 3-phenyl-3-(2-thienyl) propyl bromide, 400 ml. of ethanol, and 400 ml. of acetone, and the resulting mixture is heated under reflux for 20 hours. It is then concentrated to remove the solvent, and the residue is dissolved in ether. The ethereal solution is washed with water, dried, and evaporated to give 4-phenyl-4-(2-thienyl)butyronitrile, suitable for use without further purification.

(2) 4-(o-fluorophenyl)-4-(2-thienyl)butyronitrile, obtained as an oil that is suitable for use without further purification by the method of (1) above from the reaction of 3-(o-fluorophenyl)-3-(2-thienyl)propyl bromide with sodium cyanide.

(3) 4-(m-tolyl)-4-(2-thienyl)butyronitrile, obtained as an oil that is suitable for use without further purification by the method of (1) above from the reaction of 3-(m-tolyl)-3-(2-thienyl)propyl bromide with sodium cyanide.

(4) 4-(5-methyl-2-thienyl)-4-phenylbutyronitrile, obtained as an oil that is suitable for use without further purification by the method of (1) above from the reaction of 3-(5-methyl-2-thienyl)-3-phenylpropyl bromide with sodium cyanide.

(G) 4-phenyl-4-(2-thienyl)butyric acids (1) 4-phenyl-4-(2-thienyl)butyric acid.—A mixture consisting of 72.5 g. of 4-phenyl-4-(2-thienyl)butyronitrile, 75 g. of potassium hydroxide, 400 ml. of water, and 750 ml. of ethanol is heated under reflux overnight, concentrated to remove most of the solvent, and the residue is treated with a mixture of water and ether. The aqueous phase is separated and acidified with dilute hydrochloric acid, and the 4-phenyl-4-(2-thienyl)butyric acid that precipitates is isolated and crystallized from benzene-hexane, M.P. 94–95° C.

(2) 4-(o-fluorophenyl)-4-(2-thienyl)butyric acid, M.P. 90–91° C., following crystallization from aqueous ethanol; obtained by the method of (1) above from the basic hydrolysis of 4-(o-fluorophenyl)-4-(2-thienyl)butyronitrile.

(3) 4-(m-tolyl)-4-(2-thienyl)butyric acid, M.P. 100.5–103° C., following crystallization from aqueous ethanol; obtained by the method of (1) above from the basic hydrolysis of 4-(m-tolyl)-4-(2-thienyl)butyronitrile.

(4) 4-(5-methyl-2-thienyl)-4-phenylbutyric acid, obtained as an oil that is suitable for use without further purification from the basic hydrolysis of 4-(5-methyl-2-thienyl)-4-phenylbutyronitrile.

(H) Dihydrobenzo[b]thiophen-4(5H)-ones (1) 2-methyl-6,7-dihydrobenzo[b]thiophen-4(5H)-one.—To a stirred mixture consisting of 98.2 g. of 2-methyl-thiophene, 150 g. of β-carbomethoxypropionyl chloride, and one liter of benzene is added dropwise 260.5 g. of stannic chloride while the temperature is maintained below 10° C. The resulting mixture is stirred below 10° C. for one hour and at room temperature for 2.5 hours and is then decomposed with dilute hydrochloric acid. The organic phase is separated, washed with water, with saturated aqueous sodium bicarbonate, and with water again until neutral, dried, and concentrated to give 2-methyl-5-(3-carbomethoxypropionyl)thiophene, suitable for use without further purification.

To a solution of 173.3 of 2-methyl-5-(3-carbomethoxypropionyl)thiophene in 750 ml. of ethanol is added 500 ml. of 3.6 N-potassium hydroxide, and the resulting mixture is heated under reflux for 90 minutes. It is then concentrated to remove the ethanol, and the aqueous residue is washed with ether and acidified with dilute hydrochloric acid to precipitate 2-methyl-5-(3-carboxypropionyl)thiophene, which is isolated and dried, M.P. 101–105° C.

A mixture consisting of 147.8 g. of 2-methyl-5-(3-carboxypropionyl)thiophene, 147.8 g. of potassium hydroxide, 115 ml. of hydrazine hydrate, and 900 ml. of diethylene glycol is heated at about 100° C. under a water separator until no more water is collected, and then at about 200° C. for four hours. Upon cooling, the resulting mixture is diluted with 2 liters of water, and the aqueous mixture is acidified with hydrochloric acid. The acidified mixture is extracted with ether, and the ether extracts are combined, washed with water, dried, and concentrated. The residue is distilled to give 4-(2-methyl-5-thienyl)butyric acid, B.P. 114–120° C./0.35–0.5 mm. Hg.

To a solution of 120.7 g. of 4-(2-methyl-5-thienyl)butyric acid in 180 ml. of trifluoroacetic acid is added dropwise 138 g. of trifluoroacetic acid anhydride, and the resulting mixture is heated under reflux overnight. It is then concentrated to remove the solvent, and the residue is dissolved in ether. The ethereal solution is washed with 5% aqueous sodium hydroxide and with water until neutral, dried, and distilled to give 2-methyl-6,7-dihydrobenzo[b]thiophen-4(5H)-one, B.P. 81–89° C./0.6 mm. Hg.

(2) 7-phenyl-6,7-dihydrobenzo[b]thiophen-4(5H)-one.—To a solution of 52.8 g. of 4-phenyl-4-(2-thienyl)butyric acid in 400 ml. of trifluoroacetic acid is added dropwise 45.5 g. of trifluoroacetic acid anhydride, and the resulting mixture is stirred at room temperature for one hour. An additional 2 ml. of trifluoroacetic acid anhydride is added, and the mixture is stirred at room temperature overnight, heated under reflux for one hour, and concentrated. The residue is dissolved in ether, and the ethereal solution is washed with 2.5% aqueous sodium hydroxide and with water, dried, and concentrated to give a solid residue of 7-phenyl-6,7-dihydrobenzo[b]thiophen-4(5H)-one, M.P. 65.5–68.5° C., following crystallization from hexane.

(3) 7-(o-fluorophenyl)-6,7-dihydrobenzo[b]thiophen-4(5H)-one, B.P. 140–175° C./0.4 mm. Hg; obtained from the reaction of 4-(o-fluorophenyl)-4-(2-thienyl)butyric acid with trifluoroacetic acid anhydride in trifluoroacetic acid according to the method of (2) above.

(4) 7-(m-tolyl)-6,7-dihydrobenzo[b]thiophen-4(5H)-one, B.P. 150–152° C./0.15–0.30 mm. Hg; obtained by the method of (1) above from the reaction of 4-(m-tolyl)-4-(2-thienyl)-butyric acid with trifluoroacetic acid anhydride in trifluoroacetic acid.

(5) 7-methyl-6,7-dihydrobenzo[b]thiophen-4(5H)-one, B.P. 93–95° C./0.8–1.1 mm. Hg; obtained from the following series of reactions. Ethyl 3-(2-thienyl)crotonate is hydrogenated according to the procedure described in C(1) above to give ethyl 3-(2-thienyl)butyrate, B.P. 63–69° C./0.2–0.3 mm. Hg; the ethyl 3-(2-thienyl)butyrate is reduced by reaction with lithium aluminum hydride and subsequent hydrolysis of the reaction product according to the method of D(1) above to give 3-(2-thienyl)butan-1-ol, B.P. 70–83° C./0.2–0.3 mm. Hg; the 3-(2-thienyl)butan-1-ol is reacted with phosphorus tribromide according to the procedure of E(1) above to give 3-(2-thienyl)butyl bromide, B.P. 64–80° C./0.2–0.4 mm. Hg; this halide intermediate is next reacted with sodium cyanide in aqueous acetone-ethanol according to the procedure of F(1) above and the 4-(2-thienyl)valeronitrile product is subjected to basic hydrolysis according to the procedure described in G(1) above to give 4-(2-thienyl)valeric acid, which is finally reacted with trifluoroacetic acid anhydride in trifluoroacetic acid according to the procedure of H(1) above to give the desired 7-methyl-6,7-dihydrobenzo[b]thiophen-4(5H)-one.

(6) 2-methyl-7-phenyl-6,7-dihydrobenzo[b]thiophen-4(5H)-one, M.P. 150–155° C./0.2–0.4 mm. Hg; obtained from the reaction of 4-(5-methyl-2-thienyl)-4-phenylbutyric acid with trifluoroacetic acid anhydride in trifluoroacetic acid under reflux according to the method of (2) above.

(I) Phenyl-substituted dihydrobenzo[b]thiophenes (1) 2-methyl-4-phenyl-6,7-dihydrobenzo[b]thiophene.—To a solution of phenyl magnesium bromide (prepared from 42.5 g. of bromobenzene, 6.5 g. of magnesium, and 200 ml. of ether) is added dropwise with stirring a solution of 39.3 g. of 2-methyl-6,7-dihydrobenzo[b]thiophen-4(5H)-one in 300 ml. of ether, and the resulting mixture is stirred at room temperature for 18 hours. The mixture is then hydrolyzed by treatment with dilute hydrochloric acid, and the organic phase is separated, washed with water, with saturated aqueous sodium bicarbonate, and with water again until neutral, dried, and evaporated to dryness. To the oily residue is added 100 ml. of acetic anhydride, and the resulting solution is heated under reflux for two hours, cooled, and poured into water. The aqueous mixture is made alkaline with 50% sodium hydroxide, and the alkaline mixture is extracted with ether. The combined ether extracts are washed with water until neutral, dried, and evaporated to dryness. To the residue is added 200 ml. of absolute ethanol, 16 g. of (carboxymethyl)trimethylammonium chloride hydrazide (Girard's reagent T), and 16 ml. of acetic acid and the resulting mixture is heated under reflux for one hour. Ethylene glycol (200 ml.) is then added, and the mixture is concentrated to remove the ethanol. The concentrated solution is extracted with ether, and the ether extracts are washed with water, with saturated aqueous sodium bicarbonate, and with water again until neutral, dried, and evaporated to dryness. The residue obtained is then distilled under reduced pressure to give 2-methyl-4-phenyl-6,7-dihydrobenzo[b]thiophene, collected between 105 and 175° C. at 0.6 mm. Hg.

(2) Utilizing the foregoing general procedure, the following phenyl-substituted dihydrobenzo[b]thiophenes are obtained from the reaction of the appropriate reactants:

(a) 4 - phenyl-7-methyl-6,7-dihydrobenzo[b]thiophene, M.P. 87–93° C.

(b) 4-(m-fluorophenyl)-7-methyl-6,7-dihydrobenzo[b]thiophene, M.P. 63.5–67° C.

(c) 4-(o-chlorophenyl)-7-methyl-6,7-dihydrobenzo[b]thiophene, obtained as an oil that is suitable for use without further purification.

(d) 4-(m-chlorophenyl)-7-methyl-6,7-dihydrobenzo[b]thiophene, obtained as an oil that is suitable for use without further purification.

(J) Phenylbenzo[b]thiophenes (1) 2-methyl-4-phenylbenzo[b]thiophene.—A mixture of 44.2 g. of 2-methyl-4-phenyl-6,7-dihydrobenzo[b]thiophene and 6.56 g. of sulfur is heated at 222–232° C. for 30 minutes, cooled, and dissolved in benzene. The benzene solution is poured onto a basic alumina chromatography column, and the column is eluted with benzene. The benzene eluates are evaporated, and the oily residue is distilled under reduced pressure. The fraction that distills between 128 and 180° C. at 0.6 mm. Hg is collected. Upon standing, this liquid solidifies to give 2-methyl-4-phenyl-benzo[b]thiophene, M.P. 68–69.5° C., following crystallization from methanol.

(2) Utilizing the foregoing general procedure, the following phenylbenzo[b]thiophenes are obtained from the dehydrogenation of the appropriate phenyl-substituted dihydrobenzo[b]thiophenes:

(a) 4-phenyl-7-methylbenzo[b]thiophene, M.P. 76–78° C., following crystallization from ethanol.

(b) 4 - (m-fluorophenyl)-7-methylbenzo[b]thiophene, obtained as an oil that is suitable for use without further purification.

(c) 4-(o-chlorophenyl) - 7 - methylbenzo[b]thiophene, obtained as an oil that is collected between 87 and 210° C. at 1.0–1.5 mm. Hg.

(d) 4 - (m-chlorophenyl)-7-methylbenzo[b]thiophene, obtained as an oil that is collected between 102 and 190° C. at 0.20–0.25 mm. Hg.

(3) 3-phenyl-7-methylbenzo[b]thiophene.

To 100 ml. of phosphoric acid is added in portions 132 g. of phosphorus pentoxide, and after the resulting solution cools to 40° C., 12.1 g. of 2-[o-tolyl)thio]-acetophenone is added. The reaction mixture is heated at 60° C. for two hours, cooled, and poured into water. The aqueous mixture is extracted with ether, and the combined ether extracts are washed with water, with saturated aqueous sodium bicarbonate, and with water again until neutral, dried, and evaporated to dryness to give 3-phenyl-7-methylbenzo[b]-thiophene, obtained as a yellow oil collected between 97 and 142° C. at 0.5–0.7 mm. Hg.

(4) 3 - (p-fluorophenyl)-7-methylbenzo[b]thiophene.—
A mixture consisting of 14.3 g. of o-thiocresol, 25.0 g. of p-fluorophenacyl bromide, and 60 ml. of pyridine is heated under reflux for six hours, cooled, and poured into 2 liters of ice-water. The aqueous mixture is acidified with dilute hydrochloric acid, and the solid 2-[(o-tolyl)thio]-p-fluoroacetophenone that precipitates is isolated, dried, and crystallized from benzene-hexane; M.P. 49–51° C. Tris intermediate is cyclized by reaction with phosphorus pentoxide in phosphoric acid according to the procedure in (3) above to give 3-(p-fluorophenyl)-7-methylbenzo[b]thiophene, M.P. 54.5–55.5° C., following crystallization from aqueous ethanol.

(5) 3 - (p - chlorophenyl)-7-methylbenzo[b]thiophene, M.P. 79–81.5° C., following crystallization from aqueous ethanol; obtained by the procedure described in (4) above by first reacting o-thiocresol with p-chlorophenacyl bromide to give 2-[(o-tolyl)thio]-p-chloroacetophenone, M.P. 56.5–58.5° C., following crystallization from benzene-hexane, and then cyclizing this intermediate by reaction with phosphorus pentoxide in phosphoric acid.

(6) 3 - (p-bromophenyl)-7-methylbenzo[b]thiophene, M.P. 89–92° C. (aqueous ethanol); obtained by the procedure of (4) above by first reacting o-thiocresol with p-bromophenacyl bromide to give 2-[(o-tolyl)thio]-p-bromoacetophenone, M.P. 59–61.5° C. (benzene-hexane), and then cyclizing this intermediate by reaction with phosphorus pentoxide in phosphoric acid.

(7) 3-methyl-7-phenylbenzo[b]thiophene.—To a solution of 92.0 g. of 2-mercaptobiphenyl in 500 ml. of pyridine is added dropwise 45.7 g. of chloroacetone, and the resulting mixture is heated under refluxe for one hour. It is then evaporated to remove the solvent, and the residue is dissolved in ether. The ethereal solution is washed with water, several times with dilute hydrochloric acid, and with water again until neutral. The solution is then dried and evaporated to dryness to give 1-(2-biphenylyl-thio)-2-propanone; M.P. 85–86.5° C., following crystallization from ethanol. This intermediate (38.0 g.) is then cyclized by reaction with 400 g. of phosphorus pentoxide in 300 ml. of phosphoric acid according to the procedure described in (3) above to give 3-methyl-7-phenylbenzo[b]thiophene, obtained by distillation as an oil collected between 124 and 152° C. at 0.15–0.2 mm. Hg.

(K) (Bromomethyl)phenylbenzo[b]thiophenes (1) 2-bromomethyl-4-phenylbenzo[b]thiophene.—To a solution of 10.0 g. of 2-methyl-4-phenylbenzo[b]thiophene in 100 ml. of carbon tetrachloride is added 7.95 g. of recrystallized N-bromosuccinimide and 100 mg. of dibenzoyl peroxide, and the resulting mixture is heated under reflux for five hours while it is irradiated with light from a flood lamp. It is then filtered, and the filtrate evaporated to dryness. The residue is triturated with hexane, and the hexane mixture is cooled in a Dry Ice-acetone bath to give solid 2-bromomethyl-4-phenylbenzo[b]thiophene, M.P. 84–90° C.

(2) 2-phenylbenzo[b]thiophene-6-methyl bromide.—A mixture consisting of 9.5 g. of 2-phenyl-6-methylbenzo[b]thiophene (for the preparation of this compound see J. Chem. Soc., 1956, page 4791), 7.9 g. of N-bromosuccinimide, 100 mg. of dibenzoyl peroxide, and 215 ml. of benzene is heated under reflux overnight while irradiated with an incandescent light source. Upon cooling, it is filtered to remove insoluble solids, and the filtrate is washed with 5% aqueous sodium hydroxide and with water, dried, and concentrated. The residue is extracted with benzene, and the benzene extracts are evaporated to give 2-phenylbenzo[b]thiophene-6-methyl bromide, an oil that is suitable for use without further purification.

(3) Utilizing the general procedures described in (1) and (2) above, with only minor variations in reaction conditions and isolation technique, the following (bromomethyl)phenylbenzo[b]thiophenes are obtained from the reaction of the appropriate phenylbenzo[b]thiophenes with N-bromosuccinimide. In each case the product is obtained as an oil suitable for use without further purification.

(a) 3-phenylbenzo[b]thiophene-7-methyl bromide.
(b) 3-(p-fluorophenyl)benzo[b]thiophene-7-methyl bromide.
(c) 3-(p-chlorophenyl)benzo[b]thiophene-7-methyl bromide.

(d) 3-(p-bromophenyl)benzo[b]thiophene-7-methyl bromide.
(e) 4-phenylbenzo[b]thiophene-7-methyl bromide.
(f) 4-(m-fluorophenyl)benzo[b]thiophene-7-methyl bromide.
(g) 4-(o-chlorophenyl)benzo[b]thiophene-7-methyl bromide.
(h) 4-(m-chlorophenyl)benzo[b]thiophene-7-methyl bromide.
(i) 7-phenylbenzo[b]thiophene-3-methyl bromide.

(L) Phenylbenzo[b]thiopheneacetonitriles (1) 4-phenylbenzo[b]thiophene-2-acetonitrile.—A mixture consisting of 8 g. of 2-bromomethyl-4-phenylbenzo[b]thiophene, 100 ml. of benzene-wet quaternized chloromethylated styrene-divinylbenzene copolymer resin in the cyanide [CN⁻] form, such as Amberlite IRA-400 (registered trademark; for preparation of the cyanide form of this resin see J. Org. Chem., vol. 28, page 698, 1963), and 200 ml. of benzene is heated under reflux for 12 hours, cooled, and the solution is decanted from the solid resin. The resin is washed with benzene, and the washings are combined with the decanted solution. The combined benzene solution is then washed with water, dried, and evaporated to give 4-phenylbenzo[b]thiophene-2-acetonitrile as an oil that is suitable for use without further purification.

(2) 2-phenylbenzo[b]thiophene-6-acetonitrile.—A mixture consisting of 3.3 g. of 2-phenylbenzo[b]thiophene-6-methyl bromide, 0.6 g. of sodium cyanide, 25 ml. of acetone 25 ml. of N,N-dimethylformamide, and 5 ml. of water is heated under reflux for six hours and then concentrated to remove the solvent. The residue is treated with ether and ethyl acetate, and the resulting mixture is washed with water, dried, and evaporated to dryness to give a solid residue of 2-phenylbenzo[b]thiophene-6-acetonitrile, suitable for use without further purification.

(3) 3-phenylbenzo[b]thiophene-7-acetonitrile.—A mixture consisting of 153 g. of 3-phenylbenzo[b]thiophene-7-methyl bromide, 26.4 g. of sodium cyanide, 150 ml. of water, and 1500 ml. of acetone is stirred at room temperature overnight and then concentrated to remove the solvent. The residue is treated with ether, and the ethereal mixture is washed with water, dried, and evaporated to give a brown oily residue of 3-phenylbenzo[b]thiophene-7-acetonitrile, which is purified by chromatography on alumina and crystallization from ethanol, M.P. 107.5–110° C.

(4) Utilizing the general procedures described in (1), (2), and (3) above, the following phenylbenzo[b]thiopheneacetonitriles are obtained from the reaction of the appropriate (bromomethyl)phenylbenzo[b]thiophenes with sodium cyanide:

(a) 3-(p-fluorophenyl)benzo[b]thiophene-7-acetonitrile.
(b) 3-(p-chlorophenyl)benzo[b]thiophene-7-acetonitrile.
(c) 3-(p-bromophenyl)benzo[b]thiophene-7-acetonitrile.
(d) 4-phenylbenzo[b]thiophene-7-acetonitrile.
(e) 4-(m-fluorophenyl)benzo[b]thiophene-7-acetonitrile.
(f) 4-(o-chlorophenyl)benzo[b]thiophene-7-acetonitrile.
(g) 4-(m-chlorophenyl)benzo[b]thiophene-7-acetonitrile.
(h) 7-phenylbenzo[b]thiophene-3-acetonitrile.

(M) α-Alkyl-phenylbenzo[b]thiopheneacetonitriles (1) α-Methyl-3-phenylbenzo[b]thiophene-7-acetonitrile.—To a suspension of 1.6 g. of 53.4% sodium hydride in mineral oil dispersion in 15 ml. of dimethyl sulfoxide in a nitrogen atmosphere is added dropwise a solution of 8.0 g. of 3-phenylbenzo[b]thiophene-7-acetonitrile in 55 ml. of dimethyl sulfoxide while the reaction temperature is maintained below 35° C. The resulting mixture is stirred at room temperature under nitrogen for five hours, 9.1 g. of methyl iodide is added while the temperature is kept below 25° C., and the reaction mixture is stirred under nitrogen at room temperature overnight. It is then decomposed by treatment with dilute acetic acid, and the acetic acid mixture is extracted with ether. The ether extracts are washed with water, with saturated aqueous sodium bicarbonate, and with water again, dried, and evaporated to dryness to give α-methyl-3-phenylbenzo[b]thiophene-7-acetonitrile, obtained as an oil that is suitable for use without further purification.

(2) α-Ethyl-3-phenylbenzo[b]thiophene-7-acetonitrile, obtained as an oil that is suitable for use without further purification by the procedure of (1) above with the substitution of ethyl bromide for the methyl iodide.

(3) α-Butyl-3-phenylbenzo[b]thiophene-7-acetonitrile, obtained as an oil suitable for use without further purification by the procedure of (1) above with the substitution of n-butyl bromide for the methyl iodide.

(4) α-Methyl-4-phenylbenzo[b]thiophene-7-acetonitrile, obtained by the procedure of (1) above from the reaction of 4-phenylbenzo[b]thiophene-7-acetonitrile with sodium hydride and then with methyl iodide.

(5) α-Ethyl-4-phenylbenzo[b]thiophene-7-acetonitrile, obtained by the procedure of (1) above from the reaction of 4-phenylbenzo[b]thiophene-7-acetonitrile with sodium hydride and then with ethyl bromide.

(6) α-Methyl-7-phenylbenzo[b]thiophene-3-acetonitrile, obtained by the procedure of (1) above from the reaction of 7-phenylbenzo[b]thiophene-3-acetonitrile with sodium hydride and then with methyl iodide.

(N) Phenylbenzo[b]thiopheneacetic acid ester (1) Ethyl 7-phenylbenzo[b]thiophene-3-acetate.—To a solution of 2.9 g. of sodium methoxide in 100 ml. of ethanol is added 10.0 g. of 2-(biphenylyl)thiol. After stirring for 10 minutes, there is further added a solution of 8.85 g. of ethyl 4-chloroacetoacetate in 20 ml. of methanol. The resulting mixture is heated under reflux for one hour, cooled, and poured into water. The aqueous mixture is extracted with ether, and the ether extracts are washed with saturated aqueous sodium chloride, dried, and evaporated to give ethyl 4-(2-biphenylylthio)acetoacetate as an oil that can be used without further purification.

Phosphorus pentoxide (132 g.) is added in portions to 100 ml. of phosphoric acid, and after the resulting solution cools to 40° C., 15.5 g. of ethyl 4-(2-biphenylylthio)acetoacetate is added. The reaction is heated at 60° C. for two hours, cooled, and poured into water. The aqueous mixture is extracted with ether. The combined ether extracts are washed with water, with saturated aqueous sodium bicarbonate, and with water again until neutral, dried, and evaporated to dryness to give ethyl 7-phenylbenzo[b]thiophene-3-acetate as an oil that is suitable for use without further purification.

(2) Ethyl 7-phenylbenzo[b]thiophene-4-acetate.—To a mixture consisting of 6.5 g. of 7-phenyl-6,7-dihydrobenzo[b]thiophen-4(5H)-one, 5.8 g. of ethyl bromoacetate, 2.8 g. of zinc, and 50 ml. of benzene is added a crystal of iodine, and the mixture is heated under reflux for two hours. An additional 2 g. of ethyl bromoacetate and 1 g. of zinc is then added, and the reaction mixture is heated under reflux for two hours more. The mixture is then filtered to remove unreacted zinc, and the filtrate is washed with dilute hydrochloric acid, with water, with saturated aqueous sodium bicarbonate, and with water again until neutral. It is then dried and evaporated. The residue is dissolved in 100 ml. of acetic anhydride, and the solution obtained is heated under reflux for one hour and evaporated. The residue is extracted into ether, and the ether extracts are washed with saturated aqueous sodium bicarbonate and with water until neutral, dried, and evaporated. The residue obtained in this manner is dissolved in 100 ml. of absolute ethanol. To the solution is added 4 g. of (carboxymethyl)trimethylammonium chloride hydrazide and 4 ml. of acetic acid, and the resulting mixture is heated under reflux for one hour. Ethylene glycol is added, and the mixture is concentrated to remove the ethanol. The concentrated solution is then extracted with ether, and the ether extracts are washed with water, with saturated aqueous sodium bicarbonate, and with water again until neutral, dried, and evaporated to give ethyl 7-phenyl-6,7-dihydrobenzo[b]thiophene-4-acetate.

The foregoing intermediate (8.5 g.) is mixed with 1.0 g. of sulfur, and the mixture is heated at 226–230° C. for one hour to give ethyl 7-phenylbenzo[b]thiophene-4-acetate according to analogous dehydrogenation procedures described earlier.

(3) Ethyl α - methyl - 7-phenylbenzo[b]thiophene-4-acetate; prepared according to the procedure described in (2) above by first reacting 7-phenyl-6,7-dihydrobenzo[b]thiophen-4(5H)-one with ethyl α-bromopropionate and zinc to give ethyl α-methyl-7-phenyl-6,7-dihydrobenzo[b]thiophene-4-acetate and then dehydrogenating this intermediate by reaction with sulfur.

(4) Ethyl α - propyl-7-phenylbenzo[b]thiophene-4-acetate; prepared as in (2) above from the reaction of 7-phenyl-6,7-dihydrobenzo[b]thiophen - 4(5H) - one with ethyl α-bromovalerate and zinc to give ethyl α-propyl-7-phenyl-6,7-dihydrobenzo[b]thiophene-4 - acetate and the subsequent dehydrogenation of this intermediate with sulfur.

(5) Ethyl 7-(o - fluorophenyl)benzol[b]thiophene - 4-acetate; prepared as in (2) above from the reaction of 7 - (o-fluorophenyl) - 6,7-dihydrobenzo[b]thiophen - 4 (5H)-one with ethyl bromoacetate and zinc to give ethyl 7 - (o-fluorophenyl)-6,7-dihydrobenzo[b]thiophene - 4-acetate and the subsequent dehydrogenation of this intermediate with sulfur.

(6) Ethyl 7-(m-tolyl)benzo[b]thiophene-4-acetate; obtained by the procedure of (2) above from the reaction of 7-(m-tolyl)-6,7-dihydrobenzo[b]thiophen - 4(5H)-one with ethyl bromoacetate and zinc to give ethyl 7-(m-tolyl)-6,7-dihydrobenzo[b]thiophene - 4 - acetate and the subsequent dehydrogenation of this intermediate with sulfur.

(7) Ethyl α - methyl-7-(o-fluorophenyl)benzo[b]thiophene-4-acetate, isolated by distillation as an oil collected between 168 and 205° C. at 1.0–1.1 mm. Hg; obtained by the procedure of (2) above from the reaction of 7-(o - fluorophenyl)-6,7-dihydrobenzo[b]thiophen - 4(5H)-one with ethyl α-bromopropionate and zinc to give ethyl α-methyl - 7 - (o - fluorophenyl) - 6,7-dihydrobenzo[b]thiophene-4-acetate and the subsequent dehydrogenation of this intermediate with sulfur.

(8) Ethyl α-ethyl - 7 - (o-fluorophenyl)benzo[b]thiophene-4-acetate, isolated by distillation as an oil collected between 175 and 220° C. at 1.0–1.2 mm. Hg; obtained by the procedure of (2) above from the reaction of 7-(o-fluorophenyl)-6,7 - dihydrobenzo[b]thiophen-4(5H)-one with ethyl α-bromobutyrate and zinc to give ethyl α-ethyl-7-(o-fluorophenyl) - 6,7 - dihydrobenzo[b]thiophene - 4-acetate and the subsequent dehydrogenation of this intermediate with sulfur.

(9) Ethyl 2-methyl - 7 - phenylbenzo[b]thiophene-4-acetate, isolated after two distillations as an oil collected between 173 and 230° C. at 0.3 mm. Hg; obtained by the procedure of (2) above from the reaction of 2-methyl-7-phenyl-6,7-dihydrobenzo[b]thiophen - 4(5H) - one with ethyl bromoacetate and zinc to give ethyl 2-methyl-7-phenyl-6,7-dihydrobenzo[b]thiophene-4 - acetate and the subsequent dehydrogenation of this intermediate with sulfur. The dehydrogenated product in this case is purified by chromatography in benzene on neutral alumina prior to distillation.

(10) Ethyl α,2 - dimethyl - 7 - phenylbenzo[b]thiophene-4-acetate; obtained as an oil suitable for use without further purification by the procedure of (2) above from the reaction of 2-methyl-7-phenyl-6,7-dihydrobenzo[b]thiophen-4(5H) - one with ethyl α-bromopropionate and zinc to give ethyl α,2-dimethyl-7-phenyl-6,7-dihydrobenzo[b]thiophene-4-acetate and the subsequent dehydrogenation of this intermediate with sulfur.

(O) Ethyl 7-cyclohexylbenzo[b]thiopheneacetic acid esters (1) Ethyl 7-cyclohexylbenzo[b]thiophene-3 - acetate, obtained by distillation as an oil collected between 160 and 201° C. at 0.5–0.6 mm. Hg; obtained by a procedure analogous to that described in N (1) by first reacting o-cyclohexylthiophenol with ethyl 4-chloroacetoacetate in the presence of a strong base and then reacting the ethyl 4-(o-cyclohexylphenylthio)acetoacetate intermediate that is obtained with phosphorus pentoxide in phosphoric acid.

(2) Ethyl 7 - cyclohexylbenzo[b]thiophene - 4-acetate; obtained as an oil that is suitable for use without further purification from the following series of reactions. 2-cyclohexylcarbonylthiophene is reacted with ethyl bromoacetate according to the procedure of B(1) above to give ethyl 3-cyclohexyl-3-(2-thienyl)acrylate; this intermediate product is next catalytically hydrogenated according to the procedure of C(1) above to give ethyl 3-cyclohexyl-3-(2-thienyl)propionate; this propionate ester is then reacted with lithium aluminum hydride according to the procedure of D(1) above to give 3-cyclohexyl-3-(2-thienyl)propan-1-ol; this intermediate is in turn reacted with phosphorus tribromide according to the procedure of E(1) above to give 3-cyclohexyl-3-(2-thienyl)propyl bromide; this halide intermediate is then reacted with sodium cyanide according to the procedure of F(1) above to give 4-cyclohexyl-4 - (2 - thienyl) - butyronitrile; this nitrile intermediate is next hydrolyzed by reaction with an aqueous base according to the procedure of G(1) above to give 4-cyclohexyl-4-(2-thienyl)butyric acid; this acid intermediate is reacted with trifluoroacetic acid anhydride in trifluoroacetic acid according to the method of H(2) to give 7-cyclohexyl-6,7-dihydrobenzo[b]thiophen-4(5H)-one; this ketone intermediate is then reacted with ethyl bromoacetate and zinc to give ethyl 7-cyclohexyl-6,7-dihydrobenzo[b]thiophene-4 - acetate, which is finally dehydrogenated by reaction with sulfur according to the procedure described in N(2) above.

I claim:

1. A member of the class consisting of benzo[b]thiopheneacetic acid compounds that are represented by the formula

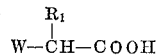

and pharmaceutically-acceptable salts thereof; where $R_1$ is a member of the class consisting of hydrogen and a lower alkyl group having not more than four carbon atoms and W represents a member of the class consisting of a 4-phenylbenzo[b]thiophene-2- group having the formula

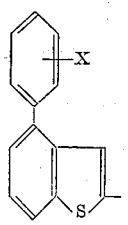

a 7-phenylbenzo[b]thiophene-3- group having the formula

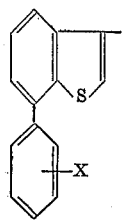

a 7-phenylbenzo[b]thiophene-4- group having the formula

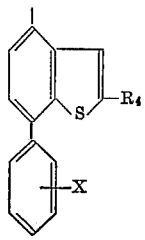

a 2-phenylbenzo[b]thiophene-6- group having the formula

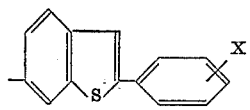

a phenyl benzo[b]thiophene-7- group having the formula

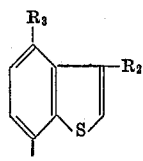

a 7-cyclohexylbenzo[b]thiophene-3- group having the formula

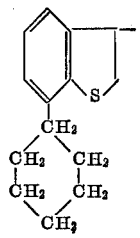

and a 7-cyclohexylbenzo[b]thiophene-4- group having the formula

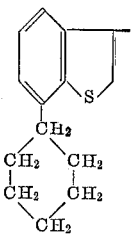

where one of $R_2$ and $R_3$ is hydrogen and the other of $R_2$ and $R_3$ is a phenyl group having the formula

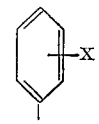

$R_4$ is a member of the class consisting of hydrogen and methyl, and X is a member of the class consisting of hydrogen, halogen, and methyl.

2. A compound according to claim 1 which is α-methyl-7-phenylbenzo[b]thiophene-3-acetic acid.

3. A compound according to claim 1 which is α-methyl-7-(o-fluorophenyl)benzo[b]thiophene-4-acetic acid.

4. A compound according to claim 1 which is α-methyl-7-phenylbenzo[b]thiophene-4-acetic acid.

5. A compound according to claim 1 which is α-methyl-3-phenylbenzo[b]thiophene-7-acetic acid.

6. A compound according to claim 1 which is α-methyl-4-phenylbenzo[b]thiophene-7-acetic acid.

References Cited

Morrison, et al., Org. Chem. (Allyn and Bacon, Boston, 1959), pp. 441, 484.

HENRY R. JILES, Primary Examiner

C. M. SHURKO, Assistant Examiner

U.S. Cl. X.R.

260—329, 332.3, 332.3, 332.5, 590; 424—275